United States Patent
Crane et al.

[11] Patent Number: 5,912,765
[45] Date of Patent: Jun. 15, 1999

[54] SUPER-RESOLUTION BY FOCAL PLANE IMMERSION

[75] Inventors: Patrick E. Crane; E. Calvin Johnson; Robert A. Wright, all of Tampa, Fla.

[73] Assignee: Patrick E. Crane, Tampa, Fla.

[21] Appl. No.: 08/267,250

[22] Filed: Jun. 29, 1994

[51] Int. Cl.$^6$ .................... G02B 21/06; G02B 21/00
[52] U.S. Cl. ............................ 359/385; 359/368
[58] Field of Search .................... 359/368, 385–389, 359/642, 709, 664, 558–568; 250/305–308; 385/73

[56] References Cited

U.S. PATENT DOCUMENTS

| | | |
|---|---|---|
| 4,119,362 | 10/1978 | Holzman ........................ 385/73 |
| 4,927,254 | 5/1990 | Kino et al. ..................... 359/368 |
| 5,004,307 | 4/1991 | Kino et al. ..................... 359/389 |
| 5,285,318 | 2/1994 | Gleckman ....................... 359/709 |

*Primary Examiner*—Thong Nguyen
*Attorney, Agent, or Firm*—James Creighton Wray; Meera P. Narasimhan

[57] ABSTRACT

Diffraction patterns in a focal region are governed by immersing the focal region in dielectric medium having an index of refraction higher than one. The pattern of the focal region is made small by causing the focal region to be immersed in a body having an index of refraction greater than 1. The resulting diffraction pattern sensed appropriately in the focal region is independent of traditional aperture limitations in resolving power. Microwave pictures are taken at the same resolution as optical pictures using the same aperture size when an appropriate dielectric immersion material is provided.

18 Claims, 2 Drawing Sheets

SUPER-RESOLUTION BY FOCAL PLANE IMMERSION

BACKGROUND OF THE INVENTION

This invention covers all fields of art which use focusing devices: optics, radar, antennas, radiometry, sonar and X-rays, microscopy, etc. Prior art limits focal plane diffraction resolution to free space resolution.

Manufacturers and users having interests in sensor systems will find this invention useful.

Needs have long existed for systems which may focus optical and other wave images to provide sharp, undistorted compressed images for receivers, sensors and displays.

SUMMARY OF THE INVENTION

The invention provides the capability to achieve resolution arbitrarily better than the Rayleigh criterion when working in receive mode. That capability derives its being from the generation of diffraction patterns in the focal plane region which are governed by immersing the focal region in dielectric medium having index of refraction higher than one. The diffraction pattern of the aperture in free space is governed by an index of refraction of n=1. The pattern in the focal region can be made arbitrarily small by causing the focal region to be properly immersed in an index of refraction n>>1, provided the optical performance of the system is sufficiently better than diffraction limitations.

The commercial value of the present invention is enormous. The invention will allow optical quality imagery to be gathered at frequencies which can see in all weather, penetrate concrete, view biological specimens, non-destructively penetrate the human body, and acoustically image underwater targets.

The immersion of the focal plane array in dielectric provides for illumination control from the individual elements of the array and the dielectric provides for the achievement of much smaller focal spots.

Image processing depends upon extracting independent samples at close intervals in the focal plane. The resolution and quality of the image is not dependent upon real beam width so much as it is on the quality of the focal plane and the focal spots. The angular resolution of the image is best when the spot size is smallest, independent of real beam width.

The equations governing the Airy Circle in the focal region and the equations describing the far field diffraction pattern are the same, or similar, following the expression where the aperture is uniformly illuminated. The angular width of the pattern is governed by wavelength, which is a function of the index of refraction of the medium. The offset of the Airy Circle in the focal plane is governed by the angle of arrival and the design of the collimation (optical, antenna or acoustical) system. That offset can be contrived by various means to be essentially the same as the incoming plane waves angle of incidence.

$$E = \int_0^a \int_0^{2\pi} e^{-ik\rho\cos(\theta-\varphi)} \cdot \rho\, d\rho\, d\theta$$

$$E = 2\cdot\pi\cdot a^2 \cdot \frac{J1(x)}{x} \quad x = \pi \cdot \frac{D}{\lambda}\cdot w$$

$$x = 0, .25, .20$$

The resulting diffraction pattern, sensed appropriately in the focal plane, becomes independent of traditional aperture limitations in its resolving power. This invention provides that microwave pictures can be taken to the same resolution as optical pictures using the same aperture size, provided an appropriate dielectric immersion material is used.

Diffraction patterns in a focal region are governed by immersing the focal region in dielectric medium having an index of refraction higher than one. The pattern of the focal region is made small by causing the focal region to be immersed in a body having an index of refraction greater than 1. The resulting diffraction pattern sensed appropriately in the focal region is independent of traditional aperture limitations in resolving power. Microwave pictures are taken at the same resolution as optical pictures using the same aperture size when an appropriate dielectric immersion material is provided.

A preferred focal plane immersion apparatus has a field lens having an aspheric surface and a spheric surface. An image lens is optically coupled to the field lens. The image lens has a curved front surface, an image plane within the image lens, and sensors connected to the image lens for sensing information on the image plane in the image lens.

The image lens curved surface comprises an aspheric surface. The field lens front surface is aspheric and the rear surface is spheric.

The field lens optically directs waves into the image lens, and the image lens focuses the waves as an image on the image surface within the lens. The image surface is curved. The image lens has a greater index of refraction than the index of refraction of the field lens.

A preferred method of achieving improved resolution by focal plane immersion, comprises directing waves from a distant object to an image lens and focusing waves in the image lens to a focal surface within the image lens. The waves are diffracted from the distant object with the image lens.

The focusing comprises focusing the image on a curved image surface embedded in the image lens.

The waves are refracted from a distant object with a field lens to a curved diffraction surface of the image lens, and further diffracting the waves with the diffraction surface of the image lens.

A preferred super resolution focal surface immersion apparatus has an elongated optical body having a convex refracting surface at one end and having an embedded focal surface near a second end opposite from the convex refractive surface. Multiple sensors are connected to the body adjacent the focal surface. The focal surface is curved.

A field lens has a first convex surface for receiving waves from a distant object and refracting waves inwardly, and has a second curved surface for refracting and directing waves to the convex surface of the body.

The first surface of the field lens is aspheric, the second surface of the field lens is concave and spheric, and the surface of the body is aspheric.

These and further and other objects and features of the invention are apparent in the disclosure, which includes the above and ongoing written specification, with the claims and the drawings.

compared to x, J1x/x is a standard notation. J1x is the first order Bessel function of the variable x, over x.

DETAILED DESCRIPTION OF THE PREFERRED EMBODIMENTS

Figure 1:
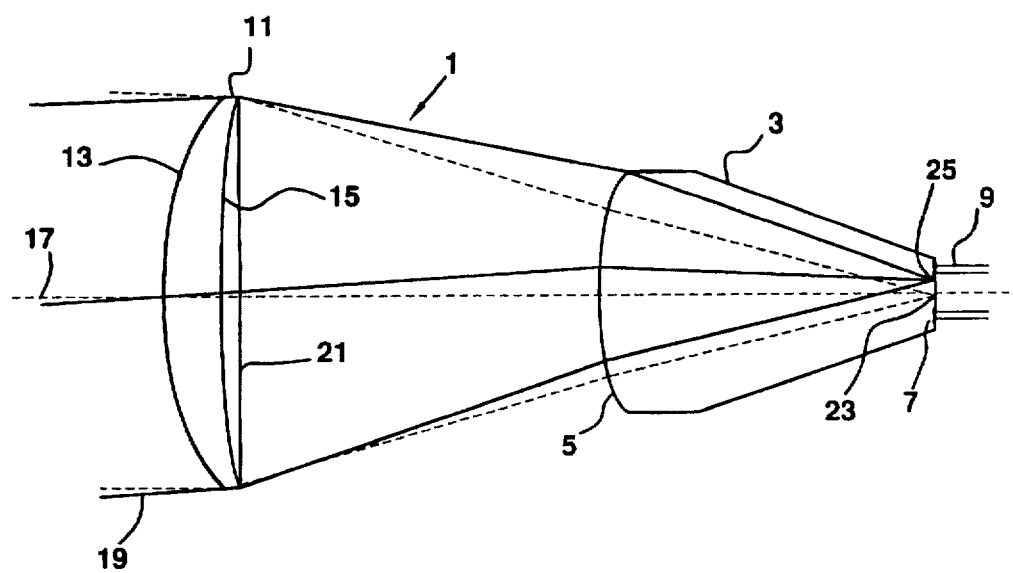
FIG. 1 shows a telecentric Petzval lens focal plane embedded in dielectric.

One of many possible embodiments is shown in FIG. 1. A telecentric system using a dielectric constant of 10 for the focal plane immersion results in a resolving power improvement of ≈3.2:1.

Prior art has assumed that free space diffraction limits are constituted by the focal plane diffraction limits for the purposes of resolving objects prior to signal processing application.

All signal processing and sampling techniques useful for improving resolution are applicable to this technique, serving to further enhance it.

Referring to FIG. 1, a lens system according to the invention is generally indicated by the numeral 1. The lens system comprises a lens body 3 or transmission medium 3 having a convex diffraction surface 5 and an image region 7 embedded in an opposite end of the body. The image region 7 may be an image or focal surface 7 which is planar or curved and is embedded in the image lens. Multiple sensors 9 are connected to the embedded image region. The lens system has a field lens 11 with a convex first surface 13 and a concave second surface 15. The convex first surface is an aspheric surface. The concave second surface is a spheric surface. The convex surface 5 of the lens body 3 is an aspheric surface. The field lens has an index of refraction which is less than the index of refraction of the image lens. In an example, the index of refraction of the field lens is 1.9, and the index of refraction of the image lens is 3.0. In the telecentric Petzval lens shown in the example the focal plane, which is a curved focal surface, is embedded in the dielectric lens body 3. In an example, an EFL is 173.3 millimeters, a diameter is 305 millimeters, and an overall length is 584 millimeters.

The lines 17 and 19 from the object schematically represent waves from a distant object which pass through an aperture 21. The waves are further focused by the refracting surface 5 to a focal region 7, where they form distinct individual image elements, shown as 23 and 25 for example. The individual images across the image region are sampled and sensed by multiple tightly packed individual sensors. When microwaves are sensed, the result is the provision of microwave pictures of the same resolution as optical pictures when the image region is immersed in the dielectric body.

Figure 2:
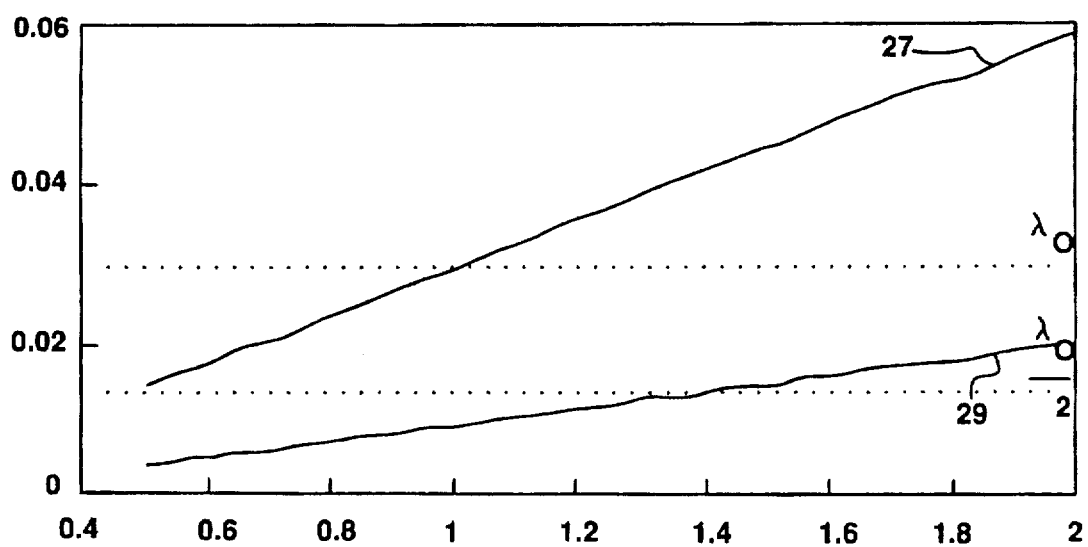
FIG. 2 shows an Airy Circle responses to free space and dielectric immersion of the image to immersion.

FIG. 2 shows Airy circle results in free space and in dielectric. The upper trace 27 represents the free space Airy circle response. The values at the left, are the Airy circle dimension in feet or, more appropriately, in hundredths of feet.

The numbers along the bottom represent the F (focal length) over D (diameter) ratio. At higher F over D ratios the Airy circle is smaller for the trace 29 representing the present invention. At the higher F over D ratios, the diffraction in free space is greater, as shown by trace 27, resulting in a less clear image.

Figure 3:
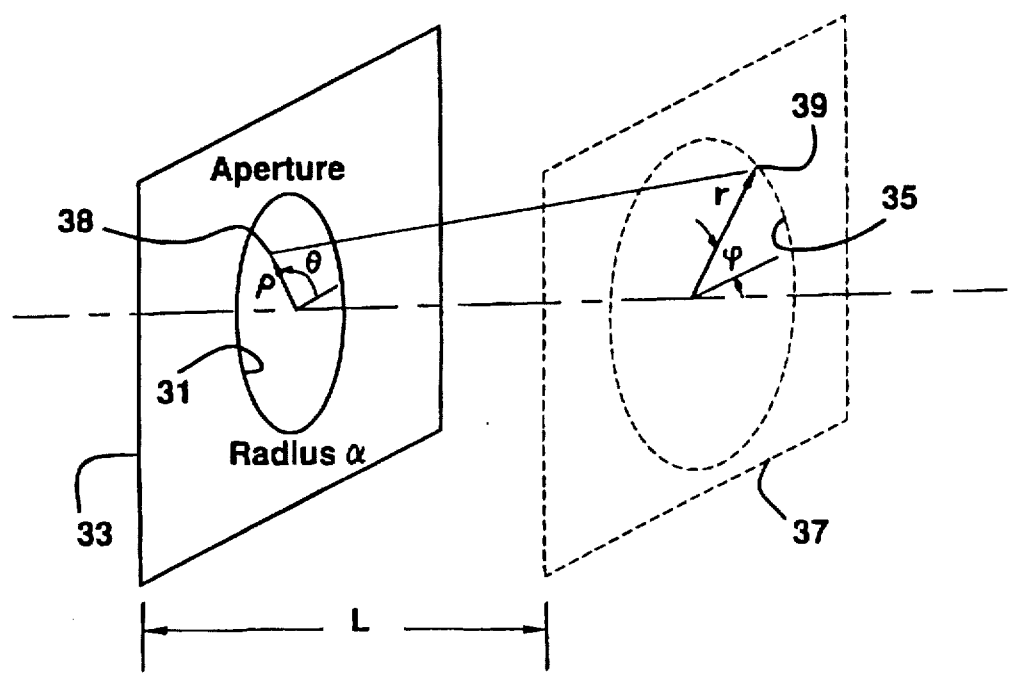
FIG. 3 shows a diffraction pattern for circular aperture.

FIG. 3 is a schematic representation of a diffraction pattern for a circular aperture. The aperture 31 is shown in plane 33. The aperture produces an enlarged image 35 in the image plane 37. A spot 38 within the aperture 31 is projected as a spot 39 on the image plane. The spot 38 in the aperture is located at a radius row at angle θ from the horizontal. The corresponding spot 39 on the image plane is located at the increased radius r at the angle φ.

Figure 4:
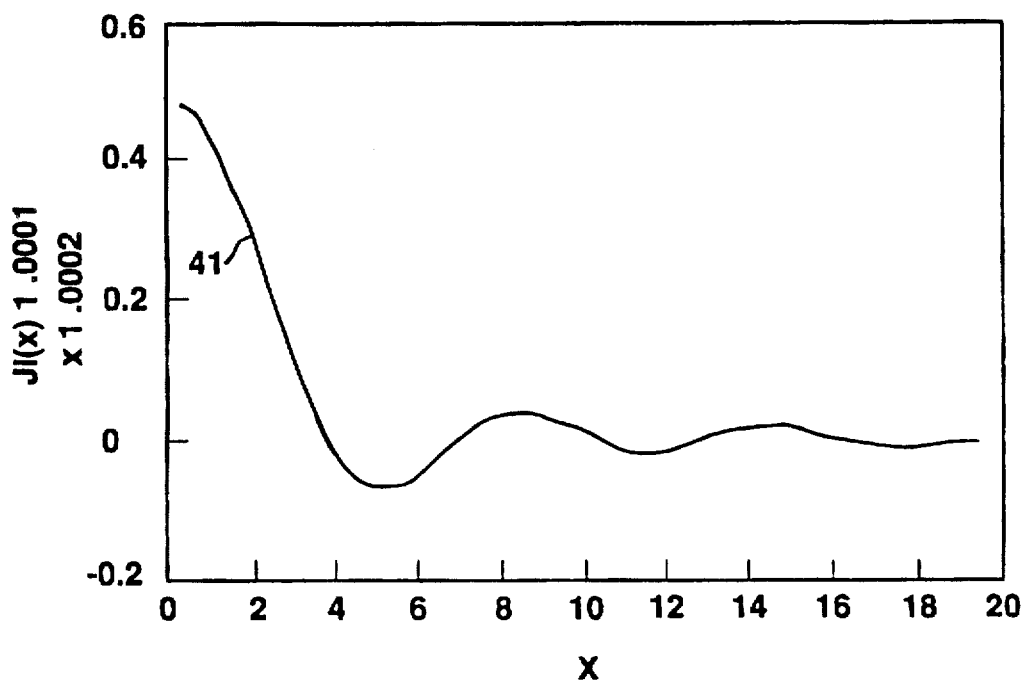
FIG. 4 shows a relationship of $$\frac{J1x}{x}$$

FIG. 4 shows the relations of $$\frac{J1x}{x}$$

as compared with x, as shown by the trace 41.

While the invention has been described with reference to specific embodiments, modifications and variations of the invention may be constructed without departing from the scope of the invention, which is defined in the following claims.

We claim:

1. Focal plane immersion apparatus, comprising a field lens having an aspheric surface and a spheric surface, an image lens optically coupled to the field lens, the image lens having a curved front surface, an image plane within the image lens, and sensors connected to the image lens for sensing information on the image plane in the image lens.

2. The apparatus of claim 1, wherein the image lens curved surface comprises an aspheric surface.

3. The apparatus of claim 2, wherein the field lens front surface is aspheric and the rear surface is spheric.

4. The apparatus of claim 1, wherein the field lens optically directs waves into the image lens, and wherein the image lens focuses the waves as an image on the image plane within the lens.

5. The apparatus of claim 1, wherein the image lens has a greater index of refraction than an index of refraction of the field lens.

6. The aparatus of claim 5, wherein the indexes of refraction are greater than 1.

7. A method of achieving improved resolution by focal plane immersion, comprising the steps of directing waves from a distant object to a convex refracting surface at an end of an image lens, and focusing waves in the image lens to a focal surface embedded at another end within the image lens.

8. The method of claim 7, further comprising the steps of diffracting the waves from the distant object with the image lens.

9. The method of claim 8, wherein the focusing step comprises focusing the image on the focal surface embedded in the image lens.

10. The method of claim 7, further comprising the steps of refracting the waves from a distant object with a field lens to a curved diffraction surface of the image lens, and further diffracting the waves with the diffraction surface of the image lens.

11. The apparatus of claim 10, wherein the image lens has a greater index of refraction than an index of refraction of the field lens.

12. The aparatus of claim 11, wherein indexes of refraction are greater than 1.

13. The method of claim 7, further comprising the step of sensing the image within the image lens.

14. Super resolution focal surface immersion apparatus, comprising an elongated optical body having a convex refracting surface at one end and having a focal surface embedded in a second end opposite from the convex refractive surface.

15. The apparatus of claim 14, further comprising multiple sensors connected to the body adjacent the focal surface.

16. The apparatus of claim 14, further comprising a field lens having a first curved surface for receiving waves from a distant object and refracting waves inwardly, and having a second curved surface for refracting and directing waves to the convex surface of the body.

17. The apparatus of claim 16, wherein the first curved surface of the field lens is aspheric and wherein the second surface of the field lens is concave and spheric, and wherein a surface of the body is aspheric.

18. A method of achieving improved resolution at a focal surface comprising an image focusing collimation system containing one or more convex refractive or reflective elements at one end, a focal surface in which to form the image, and a transmission medium containing the focal surface embedded at another end and having an index of refraction greater than 1 which partially or completely fills the volume between the collimation system and the focal surface.

* * * * *